United States Patent
Bouhelal

(10) Patent No.: US 7,241,844 B2
(45) Date of Patent: Jul. 10, 2007

(54) METHOD FOR CROSS-LINKING ISOTACTIC POLYMERS IN THE PRESENCE OF PEROXIDE

(76) Inventor: Said Bouhelal, c/o Bush Lewis, PLLC, 1240 Orleans St., Beaumont, TX (US) 77701

( * ) Notice: Subject to any disclaimer, the term of this patent is extended or adjusted under 35 U.S.C. 154(b) by 0 days.

(21) Appl. No.: 11/192,890

(22) Filed: Jul. 29, 2005

(65) Prior Publication Data

US 2005/0261430 A1    Nov. 24, 2005

Related U.S. Application Data

(63) Continuation-in-part of application No. 10/473,351, filed as application No. PCT/DZ02/00001 on Apr. 22, 2002, now Pat. No. 6,987,149.

(51) Int. Cl.
*C08C 19/20* (2006.01)
*C08C 19/34* (2006.01)
*C08F 8/34* (2006.01)

(52) U.S. Cl. ............ 525/354; 525/345; 525/343; 525/348

(58) Field of Classification Search ............... 525/345, 525/354, 343, 348
See application file for complete search history.

(56) References Cited

U.S. PATENT DOCUMENTS

| | | | |
|---|---|---|---|
| 3,012,016 A | 12/1961 | Kirk, Jr. | 260/79.5 |
| 3,143,584 A | 8/1964 | Roberts | 264/210 |
| 3,256,366 A | 6/1966 | Corbelli | 260/897 |
| 3,258,447 A | 6/1966 | Matteucci | 260/41 |
| 3,336,254 A | 8/1967 | White | 260/41 |
| 3,546,326 A * | 12/1970 | Bittscheidt et al. | 264/211.24 |
| 3,575,920 A | 4/1971 | Ballini | 260/41 |
| 3,668,192 A * | 6/1972 | Seifert et al. | 524/576 |
| 3,806,558 A * | 4/1974 | Fischer | 525/198 |
| 4,104,210 A | 8/1978 | Coran | 260/888 |

FOREIGN PATENT DOCUMENTS

GB    989372    4/1965

* cited by examiner

*Primary Examiner*—Ling-Sui Choi
(74) *Attorney, Agent, or Firm*—Buskop Law Group, PC; Wendy Buskop

(57) ABSTRACT

A method for making isotactic polymer using a cross-linking agent entails introducing the cross-linking agent to a polymer and an accelerator. The cross-linking agent includes a peroxide and a sulfur. The peroxide has an activity ranging from about 40% to about 100%. The ratio of the accelerator to sulfur or peroxide ranges from 1:4 to 1:10 depending on the activity of the peroxide. The method further entails shearing the polymer in a high shear rate mixer and initiating cross-linking with the peroxide, wherein the accelerator partially inhibits the cross-linking of the peroxide. The method ends by forming macro radicals during the cross-linking; and forming macromolecular chains of polymer with sulfur bridges without the need for high torque. The accelerator ensures that the cross-linking and the formation of sulfur bridges occur simultaneously.

24 Claims, No Drawings

METHOD FOR CROSS-LINKING ISOTACTIC POLYMERS IN THE PRESENCE OF PEROXIDE

CROSS REFERENCE TO RELATED APPLICATIONS

The present application is a Continuation-in-Part to U.S. patent application Ser. No. 10/473,351, filed Sep. 30, 2003, now U.S. Pat. No. 6,987,149, which is the national phase application claiming priority to PCT/DZ02/00001 filed Apr. 22, 2002.

FIELD

The present embodiments relate generally to methods for cross-linking isotactic polymer in the presence of peroxide. The present embodiments further relate to products made by isotactic polymer cross-linking in the presence of peroxide.

BACKGROUND

Recent developments in the art of polymerization have enabled the production of solid, amorphous polypropylene and co-polymers of ethylene and propylene that have many of the physical characteristics of rubber and, in fact, can be used as an improved replacement for rubber in many applications. These amorphous polymers and co-polymers are thermoplastic and soluble in many organic solvents. Like rubber, these polymers and co-polymers have to be cross-linked, i.e. vulcanized, in order to render the polymers and co-polymers useful for many of the intended uses.

Almost all of the plastic resin sold in the market today is in the form of pellets. Plastic resins are sold in the form of pellets to improve transportation, handling, safety and end-user material processability characteristics. Reactor granular resin is thus melted and extruded and made to flow through dies before being cut into pellets. The extrusion process serves as a step for the addition of performance additives for the required stability and material properties. The size, shape, and uniformity of the pellets are important and measures of these pellet characteristics are standard quality assurance/quality control (QA/QC) tests to be met during production. The pelletizing step is important from an operational standpoint. Any upset or malfunction of the pelletizer can result in process shutdown and halt manufacturing with serious financial consequences, especially for large extrusion lines. The pelletizing step becomes an important component of the production line of any polyolefin production facility. The pelletizing step is not to be taken lightly in cases where the polymer renders difficult cut.

The present embodiments meet these needs.

DETAILED DESCRIPTION OF THE EMBODIMENTS

Before explaining the present embodiments in detail, it is to be understood that the embodiments are not limited to the particular embodiments and that it can be practiced or carried out in various ways.

The present embodiments are methods for forming reversible cross-linked isotactic polypropylene miscible with polyethylene using readily available chemicals. Cross-linked plastics usually cannot melt and, therefore, cannot be reprocessed or mixed with other polymers and reprocessed. Cross-linked plastic, therefore, cannot be recycled. Only polymers with reversible cross-linking can be reprocessed or recycled. These types of polymers are known as thermoplastic elastomers.

The embodied methods utilize a cross-linking agent with the polymer to create long chain polymers that can be easily recycled. The methods utilize a high shear rate mixer with very low torque at a low pressure, thereby saving on energy costs.

The present embodiments provide a batch or continuous feed process that produces reversible cross-linked polymer (such as recyclable miscible polypropylene) that can by immediately implemented for mass production. The reversible cross-linked polypropylene is produced at only a nominal cast above the present cost of isotactic polypropylene. The cost is nominal because the technique uses the readily available chemical complexes peroxide and sulfur and the catalysts, such as TMTM, TMTD and MBTS. The technique used to accomplish the cross-linking entails mixing the catalysts together and introducing the mixture into an extruder to mix at molten state with the desired combinations. The cross-linked polypropylene can be recycled many times with the same extruder operating conditions. Any peroxide with a decomposition temperature greater that 140 degrees Celsius can be used in cross-linking.

The present embodiments concern methods for cross-linking isotactic polymer, both the homopolymer and modified polymer. Examples of usable polymers include isotactic polypropylene homopolymer; isotactic polypropylene copolymer; mixtures of isotactic polypropylene homopolymer with an elastomer; mixtures of isotactic polypropylene homopolymer with thermoplastic-based mixes; mixtures of isotactic polypropylene copolymer with an elastomer; mixtures of isotactic polypropylene copolymer with thermoplastic-based mixes; and combinations thereof. The homopolymer and copolymers can be granular, recycled, restored, or combinations thereof.

The cross-linking reaction provides the polymer with new morphological structures, but the crystalline part remains more or less stable. The embodied cross-linking agent is a chemical product consisting of peroxide and sulfur, in addition to accelerators for sulfur.

The embodied cross-linking processes are fully chemical. The reaction is homolytic. The cross-linking agent reacts at temperatures corresponding to polymer transformation and mixing temperatures. The macro molecular chains of the polymer are cross-linked by bridges mainly made of sulfur. For example, the bridge can be a sulfur atom S1, a polysulphide Sx, or a sulfur cyclic compound.

The embodied methods for making isotactic polymer using a cross-linking agent entail introducing a cross-linking agent to a polymer. An example of usable a polymer is polypropylene, Mopel TQ, available from Basel. In one alternative, the polymer is prepared as a simple solid state mixture of polymer granules in a peroxide powder, thereby providing an appropriate dispersion of polymer granules in the powder. The cross-linking agent can be dispersed in an oil and then metered into the extruder during the compression stage.

The cross-linking agent can comprise a peroxide and a sulfur. The cross-linking agent creates macro radicals at temperatures ranging from about 65 degrees Celsius to about 300 degrees Celsius. The cross-linking agent can be pre-blended with an oil, such as vegetable oil, and the polymer prior to adding to the extruder. An example amount of oil ranges from 0.01 wt % to 1 wt % in relation to the polymer. The chosen oil should not react with the different components and should not decompose before 250 degrees Celsius.

Other solvents, such as xylene, can be used to fix the agents without affecting color. The cross-linking agent can include from about 0.001 wt % to about 10 wt % of peroxide and from about 0.01 wt % to about 10 wt % of sulfur. The accelerator is present is ranges from about 0.0025 wt % to about 2.5 wt % of the overall composition. An example cross-linking agent can include 2 wt % of the peroxide, 2 wt % of the sulfur, 0.5 wt % of the accelerator, and the completion of a polypropylene/polyethylene mixture in a 1:1 ratio. In order to cause the cross-linking, only a small amount of the cross-linking agent is needed. The small amount can be used to crosslink isotactic polypropylene, low density polyethylene, or high density polyethylene.

The peroxide has an activity ranging from about 40% to about 100%. The percentage of activity of peroxide is related to the amount of peroxide active within the mixture, such as a paste, or the phthalate plasticizer, or a paste of silicone oil. The peroxide can have a decomposition temperature greater than 100 degrees Celsius. The decomposition time is dependent on the activity and the temperature of decomposition. The activity influences the rate and the temperature at the same time and, therefore, the efficiency of the peroxide. Using different mixtures of peroxides can to increase the decomposition time and the paste is to delay the decomposition temperature. The peroxide can be in powder or granular form. Use of a powder can provide better dispersion, especially if the powder is composed of granulars with similar granulometry. As the temperature rises, the powder or granular peroxide becomes a liquid.

One example of a peroxide usable is a mixture of phthalate plasticizer and silicone oil. Other examples of peroxide include dicymyl peroxide (DCP) (activities of 40%, 50%, 95%, and 96%), DI (2-terl-butylperoxydopropyl)benzene (activity of 85%), benzyl peroxide (activities of 50%, 70%, and 80%), 2,4-Dichlorobenzoyl-peroxide (activity of 50%), and 2,5-D-(t-butyl peroxy)-2,5-dimethylhexane (activities of 45% and 50%). The peroxide exhibits an exothermic reaction and can be explosive, so caution needs to be used for peroxides with a high activity.

The accelerators can act as inhibitor agents for the peroxides. If an accelerator is used with potassium anions, the potassium anions can be combined with the alkoide of peroxide after decomposition to form salt. The formed salt acts on the olefin chains to form double bonds and provide regeneration of the intermediate catalyst agent. The double bonds are useful to form bridges of the polymer chains. In another case, the accelerator can be used as oxidizing ions since the accelerator can react with different components, especially amine groups.

The accelerator can have an activation temperature of greater than 140 degrees Celsius. Examples of accelerators include tetramethyl thiuram disulphide (TMTD), tetramethyl thiuram monosulphide (TMTM), ethylidene aniline (DPG), mercaptobenz-thiazole (MBT), di-benzthiazyldisulphide (MBTS), and n-cyclohexylsulphenamide. The ratio of the accelerator to sulfur or peroxide ranges from 1:4 to 1:10 depending on the activity of the peroxide. An exemplary ratio of the accelerator to sulfur used in the methods is 1:8.

The concentration of the accelerator to the sulfur concentration can range from a ratio 1:4 to a ratio of 1:1. The lower ratios can be used when the extruder used for mixing is a traditional single-screw extruder with three stages. The higher mass concentrations of the cross-linkable couple produce higher degrees of cross-linking, and, therefore, use a higher screw torque.

The method continues by shearing the polymer in a high shear rate extruder. An extruder is a device that pumps a plastic through a desired die or shape. Examples of usable extruders include single screw extruders, parallel twin type extruders, and vented extruders. In general, a conical twin-screw extruder will generate a cross-linked polymer with a higher degree of cross-linking than a parallel twin-screw with a high torque, wherein parallel twin-screw with a high torque will generate a cross-linked polymer with a higher degree of cross-linking than that obtained by a single-screw extruder. The single screw extruder can provide a torque of at least sixty turns per minute.

The cross-linking agent can be resident in a compression/mixing section of the extruder for less than thirty seconds to produce an essentially colorless cross-linked polymer. The cross-linking agent can be resident in a compression/mixing section of the extruder for less than one second and still produce quality cross-linked polymers. A vacuum pump can be added to the extruder to facilitate the extrusion process.

The method next entails initiating cross-linking with the peroxide and using the accelerator to inhibit partially the cross-linking of the peroxide. This step is done at a temperature of about 140 degrees Celsius, but other initiation temperatures can be used. The initiation reaction is caused by the peroxide radical to form macro radicals. A propagation reaction with sulfur occurs to create covalent bonds are created. The propagation reaction takes place before the quick stop of these macro radicals since the macro radicals have a very short lifetime.

Macro radicals are formed during the cross-linking. The peroxide radical ensures the macro radical formation, while the sulfur causes the macromolecular chains to join through the formation of a heat stable three-dimensional network. The addition of a single accelerator or a mixture of accelerators and sulfur is sometimes required in order to ensure the two processes—the formation of macro radicals and the coupling—occur simultaneously. The method results in forming macromolecular chains of polymer with sulfur bridges without the need for high torque in the extruder. The accelerator ensures that the cross-linking and the formation of sulfur bridges occur simultaneously.

The macro radical formed has a life span that depends on the type of peroxide used. The peroxide can be a mixture of peroxides that can lengthen the life of the macro radicals. In addition, the combinations of several types of accelerators significantly improve the speed of activation of sulfur. The working principle of this couple or cross-linking agents is to make all macro radicals react simultaneously with sulfur. The simultaneous reactions ensure that the cross-linking is optimal for each formulation.

The optimization of the degree of cross-linking depends on the efficiency of the peroxide radical and sulfur speed of activation. The efficiency of the peroxide radical and sulfur speed of activation is considered in relation to the transformation temperature and the specific characteristics and performances of the extruder. The degree of cross-linking is based upon the concentration of the cross-linkable couple that, in turn, is based upon the mass ratio of the components. For example, the percentage of cross-linking is based upon the concentration of peroxide to sulfur and the concentration of the accelerator to sulfur. Peroxide can be used in equal parts to sulfur or accelerator as well as in higher or lower percentage to sulfur or accelerator.

The cross-linking operation can be performed for homopolymers, copolymers, recycled or restored polymers as well as polypropylene mixed with various types of polyethylene.

The methods can include the step of combining an elastomer with the polymer. Adding the elastomer increases the impact strength of the cross-linked polymer. Examples of usable elastomers include ethylene propylene diene monomer (EPDM), ethylene propylene rubber (EPR), ethylene propylene monomer (EPM), and combinations thereof.

Further, the methods can include the step of including additional components in the polymer formulation. For example, these additional components can be odor controlling additives (such as potassium persulfate), antioxidants, fillers (such as talc), and combinations thereof.

Several compositions of the cross-linking agents have been successfully achieved up to a mass ratio of twice the sulfur mass. The compositions that resulted in a mass ratio of twice the sulfur mass include the DI (2-terl-butylperoxydopropyl) benzene as the peroxide in ethylene vinyl acetate; tetramethyl thiuram disulphide (TMTD) and tetramethyl thiuram monosulphide (TMTM) as the accelerator. DI (2-terl-butylperoxydopropyl)benzene is a mixture of isomer 1.3 and 1.4 di (2-tertbutylperoxyisopropyl)benzene.

Examples of usable peroxides include all types of peroxide with temperatures of decomposition over 100 degrees Celsius. Accelerators with activation temperatures over 140 degrees Celsius can be used. In order to manufacture a cross-linked polymer, a compromise between the cross-linking time and the residence time in the extruder should be established.

The analysis of dynamic rheology using a plastograph facilitates the monitoring and control of the degree of cross-linking and the formation of interpenetrating networks for incompatible mixes, such as polypropylene and various types of polyethylene. Alternatively, the method can include mixing the components directly in the extruder, then perform the injection molding or blow injection since the material is recyclable and the rheology of the first cycle is completely different than the second cycle.

EXAMPLE 1

A 1:1 mixture of polypropylene and polyethylene were subjected to the embodied methods in a plastograph room of 30 ml, at a temperature of 180 degrees Celsius, with an extruder torque of 60 turns/min. The couple concentrations were as follows: peroxide 2%, sulfur 2% and TMTD 0.5% in the polymer mass used. The overall polymer mass was 28 grams. The maximum cross-linking time was three minutes at a torque over 1,600 Kgf·m.

While these embodiments have been described with emphasis on the preferred embodiments, it should be understood that within the scope of the appended claims, the embodiments might be practiced other than as specifically described herein.

What is claimed is:

1. A method for cross-linking isotactic polymer, wherein the method comprises the steps of
   a. introducing a cross-linking agent to an isotactic polymer and an accelerator which is tetramethyl thiuram monosulphide or tetramethyl thiuram disulphide, wherein the cross-linking agent comprises a peroxide and a sulfur, wherein the peroxide comprises an activity ranging from about 40% to about 100%, and wherein the ratio of the accelerator to sulfur or peroxide ranges from 1:4 to 1:10 depending on the activity;
   b. shearing the isotactic polymer in a high shear rate mixer;
   c. initiating cross-linking with the peroxide at a temperature of about 140 degrees Celsius while using the accelerator to inhibit partially the cross-linking of the peroxide;
   d. forming macro radicals during the cross-linking; and
   e. forming macromolecular chains of isotactic polymer with sulfur bridges without the need for high torque, wherein the accelerator ensures that the cross-linking and the formation of sulfur bridges occurs simultaneously.

2. The method of claim 1, wherein the isotactic polymer is selected from the group consisting of isotactic polypropylene homopolymer; isotactic polypropylene copolymer; mixtures of isotactic polypropylene homopolymer with an elastomer; mixtures of isotactic polypropylene homopolymer with thermoplastic-based mixes; mixtures of isotactic polypropylene copolymer with an elastomer; mixtures of isotactic polypropylene copolmer with thermoplastic-based mixes; and combinations thereof.

3. The method of claim 2, wherein the homopolymer and copolymers are granular, recycled, restored, or combinations thereof.

4. The method of claim 1, wherein the step of introducing the cross-linking agent to an isotactic polymer and the accelerator forms a mixture comprising:
   a. from about 0.001 wt % to about 10 wt % of the peroxide;
   b. from about 0.01 wt % to about 10 wt % of the sulfur;
   c. from about 0.0025 wt % to about 2.5 wt % of the accelerator; and
   d. Q.S. wt % of the isotactic polymer.

5. The method of claim 1, further comprising the step of combining an elastomer with the polymer while introducing the cross-linking agent to the polymer.

6. The method of claim 1, further comprising the step of adding a component to the polymer while introducing the cross-linking agent to the polymer, wherein the component is selected from the group consisting of an odor controlling additive, an antioxidant, a filler, and combinations thereof.

7. The method of claim 5, wherein the filler is talc.

8. The method of claim 5, wherein the odor controlling additive is potassium persulfate.

9. The method of claim 1, wherein the cross-linking agent is pre-blended with vegetable oil and the polymer prior to adding to the extruder.

10. The method of claim 8, wherein the amount of vegetable oil ranges from 0.01% to 1% of polymer.

11. The method of claim 1, wherein the cross-linking agent creates macro radicals at temperatures ranging from about 65 degrees Celsius to about 300 degrees Celsius.

12. The method of claim 1, wherein the peroxide is in powder form.

13. The method of claim 1, wherein the peroxide comprises phthalate plasticizer and silicone oil.

14. The method of claim 1, wherein the peroxide comprises a decomposition temperature greater than 100 degrees Celsius.

15. The method of claim 1, wherein the sulfur is selected from the group consisting of a compound comprising a sulfur atom S1, a polysulphide Sx, a sulfur cyclic compound, and combinations thereof.

16. The method of claim 1, wherein the accelerator has an activation temperature of greater than 140 degrees Celsius.

17. The method of claim 1, wherein the ratio of the accelerator to the sulfur is 1:8.

18. The method of claim 1, wherein the step of using the sulfur to form macromolecular chains of polymer with sulfur bridges is performed in an extruder.

19. The method of claim 17, wherein the cross-linking agent is resident in a compression/mixing section of the extruder for less than 30 seconds to produce an essentially colorless cross-linked polymer.

20. The method of claim 18, wherein the cross-linking agent is resident in a compression/mixing section of the extruder for less than one second.

21. The method of claim 17, wherein the extruder is a single screw extruder or a parallel twin type extruder.

22. The method of claim 17, wherein the extruder is a vented extruder.

23. The method of claim 17, further comprising a vacuum pump connected to the extruder.

24. The method of claim 17, wherein the extruder is a single screw extruder with a torque of at least sixty turns per minute.

* * * * *